US012399992B2

(12) United States Patent
Anderson et al.

(10) Patent No.: US 12,399,992 B2
(45) Date of Patent: Aug. 26, 2025

(54) NETWORK SYSTEMS, CLASSIFICATION METHODS, AND RELATED APPARATUSES FOR SECURITY ANALYSES OF ELECTRONIC MESSAGES

(71) Applicant: Battelle Energy Alliance, LLC, Idaho Falls, ID (US)

(72) Inventors: Matthew W. Anderson, Idaho Falls, ID (US); Matthew R. Sgambati, Rigby, ID (US); Brandon S. Biggs, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 325 days.

(21) Appl. No.: 17/663,879

(22) Filed: May 18, 2022

(65) Prior Publication Data
US 2023/0409711 A1  Dec. 21, 2023

(51) Int. Cl.
*G06F 21/56* (2013.01)
*G06F 8/53* (2018.01)
(Continued)

(52) U.S. Cl.
CPC .............. *G06F 21/563* (2013.01); *G06F 8/53* (2013.01); *G06F 9/45558* (2013.01);
(Continued)

(58) Field of Classification Search
CPC ...... G06F 21/563; G06F 8/53; G06F 9/45558; G06F 2009/45595; G06F 2009/45587; H04L 63/02; H04L 63/20
See application file for complete search history.

(56) References Cited

U.S. PATENT DOCUMENTS 9,032,525 B2   5/2015  Sallam
9,721,099 B2   8/2017  Sinclair et al.
(Continued)

FOREIGN PATENT DOCUMENTS

WO   2020/159439 A1   8/2020

OTHER PUBLICATIONS

An, J., et al., "Variational Autoencoder Based Anomaly Detection Using Reconstruction Probability," Special Lecture on IE, Dec. 27, 2015, pp. 18.
(Continued)

*Primary Examiner* — Han Yang
(74) *Attorney, Agent, or Firm* — TraskBritt

(57) ABSTRACT

Network systems, classification methods, and related apparatuses for security analyses of electronic messages are disclosed. An apparatus includes an input terminal to receive message data corresponding to an electronic message to be delivered to a destination device and processing circuitry. The processing circuitry is configured to, if the electronic message includes an attached file, disassemble the attached file to obtain assembly code from the attached file. The processing circuitry is also configured to translate the assembly code to generate function labels corresponding to functions the assembly code is configured to instruct the destination device to perform. The processing circuitry is further configured to classify the electronic message as anomalous responsive to one or more of the generated function labels being identified as suspicious.

23 Claims, 4 Drawing Sheets

(51) Int. Cl.
*G06F 9/455* (2018.01)
*H04L 9/40* (2022.01)

(52) U.S. Cl.
CPC .............. *H04L 63/02* (2013.01); *H04L 63/20* (2013.01); *G06F 2009/45595* (2013.01)

(56) References Cited

U.S. PATENT DOCUMENTS

| | | | |
|---|---|---|---|
| 10,021,128 B2 | 7/2018 | McDougal | |
| 10,505,956 B1* | 12/2019 | Pidathala | G06F 21/566 |
| 10,523,609 B1* | 12/2019 | Subramanian | H04L 51/08 |
| 10,581,898 B1* | 3/2020 | Singh | H04L 63/1416 |
| 10,609,050 B2 | 3/2020 | Caspi et al. | |
| 10,685,293 B1 | 6/2020 | Heimann et al. | |
| 10,848,519 B2 | 11/2020 | Howard et al. | |
| 10,880,328 B2 | 12/2020 | Farhady et al. | |
| 11,227,162 B1 | 1/2022 | Lu et al. | |
| 11,537,902 B1* | 12/2022 | Aydore | G06N 3/047 |
| 11,556,644 B1* | 1/2023 | Zeppenfeld | G06N 20/20 |
| 11,657,269 B2 | 5/2023 | Che et al. | |
| 2007/0112824 A1* | 5/2007 | Lock | G06F 11/0754 |
| | | | 707/999.102 |
| 2014/0095425 A1 | 4/2014 | Sipple | |
| 2018/0103302 A1 | 4/2018 | Bell | |
| 2019/0044964 A1 | 2/2019 | Chari et al. | |
| 2019/0132334 A1 | 5/2019 | Johns et al. | |
| 2019/0166144 A1 | 5/2019 | Mirsky et al. | |
| 2019/0228312 A1 | 7/2019 | Andoni et al. | |
| 2019/0272375 A1 | 9/2019 | Chen | |
| 2019/0294729 A1 | 9/2019 | Jiang et al. | |
| 2020/0076840 A1 | 3/2020 | Peinador et al. | |
| 2020/0076841 A1 | 3/2020 | Hajimirsadeghi et al. | |
| 2020/0076842 A1 | 3/2020 | Zhou et al. | |
| 2020/0092311 A1 | 3/2020 | Avrahami et al. | |
| 2020/0104498 A1 | 4/2020 | Smith et al. | |
| 2020/0134423 A1 | 4/2020 | Shinde et al. | |
| 2020/0175161 A1 | 6/2020 | Giaconi | |
| 2020/0218806 A1 | 7/2020 | Cho | |
| 2020/0257985 A1 | 8/2020 | West et al. | |
| 2020/0274787 A1 | 8/2020 | Dasgupta et al. | |
| 2020/0280573 A1 | 9/2020 | Johnson et al. | |
| 2020/0364338 A1 | 11/2020 | Ducau et al. | |
| 2021/0048993 A1 | 2/2021 | Burke | |
| 2021/0099474 A1 | 4/2021 | Huang et al. | |
| 2022/0070195 A1 | 3/2022 | Sern et al. | |
| 2022/0172050 A1 | 6/2022 | Dalli et al. | |
| 2022/0358214 A1* | 11/2022 | Anderson | G06F 21/52 |
| 2023/0027149 A1 | 1/2023 | Kuan et al. | |
| 2023/0224277 A1 | 7/2023 | Tarighat | |
| 2023/0379345 A1* | 11/2023 | Anderson | H04L 63/1425 |
| 2024/0086527 A1* | 3/2024 | Rosen | G06F 21/52 |

OTHER PUBLICATIONS

Artuso, F., et al., "In Nomine Function: Naming Functions in Stripped Binaries with Neural Networks," Machine Learning, Feb. 4, 2021, pp. 15.

* cited by examiner

NETWORK SYSTEMS, CLASSIFICATION METHODS, AND RELATED APPARATUSES FOR SECURITY ANALYSES OF ELECTRONIC MESSAGES

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

This disclosure relates generally to identification of malware documents and malware attachments in electronic messages, and more specifically to generation of function labels for assembly code for disassembled electronic message attachments and classification of these function labels to classify the electronic messages as anomalous or not anomalous.

BACKGROUND

Computing devices in networks may be vulnerable to ransomware and malware documents sent by electronic messages such as email messages. Many companies still rely on emailed office documents, which leaves their systems vulnerable to malware document attack vectors.

BRIEF SUMMARY

In some embodiments an apparatus includes an input terminal to receive message data corresponding to an electronic message to be delivered to a destination device and processing circuitry. The processing circuitry is configured to, if the electronic message includes one or more attached files, disassemble the one or more attached files to obtain assembly code from the one or more attached files. The processing circuitry is also configured to translate the assembly code to generate function labels corresponding to functions the assembly code is configured to instruct the destination device to perform. The processing circuitry is further configured to classify the electronic message as anomalous responsive to one or more of the generated function labels being identified as suspicious.

In some embodiments a network system includes one or more destination devices, a network interface, a network distribution device, and a programmable device. The network interface is configured to receive message data corresponding to an electronic message to be delivered to one of the one or more destination devices. The network distribution device is configured to deliver the received message data to the one of the one or more destination devices responsive to a determination that the electronic message includes neither an attached file nor a link. The programmable device is configured to translate, if the electronic message includes an attached file, assembly code from the attached file to generate function labels corresponding to functions the assembly code is configured to instruct the one of the one or more destination devices to perform, classify the electronic message as anomalous responsive to a determination that one or more of the function labels are suspicious, and deliver the electronic message to the one of the one or more destination devices responsive to a classification of the electronic message as not anomalous.

In some embodiments a classification method includes determining whether a received electronic message includes an attached file and disassembling the attached file responsive to a determination that the received electronic message includes the attached file to obtain assembly code from the attached file. The classification method also includes translating the assembly code to generate function labels corresponding to functions the assembly code is configured to instruct a destination device to perform and classifying the function labels, using a variational autoencoder trained to identify suspicious function labels, as suspicious or not suspicious. The classification method further includes classifying the received electronic message as anomalous responsive to a classification of the attached file as anomalous and classifying the received electronic message as not anomalous responsive to a classification of the attached file as not suspicious.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
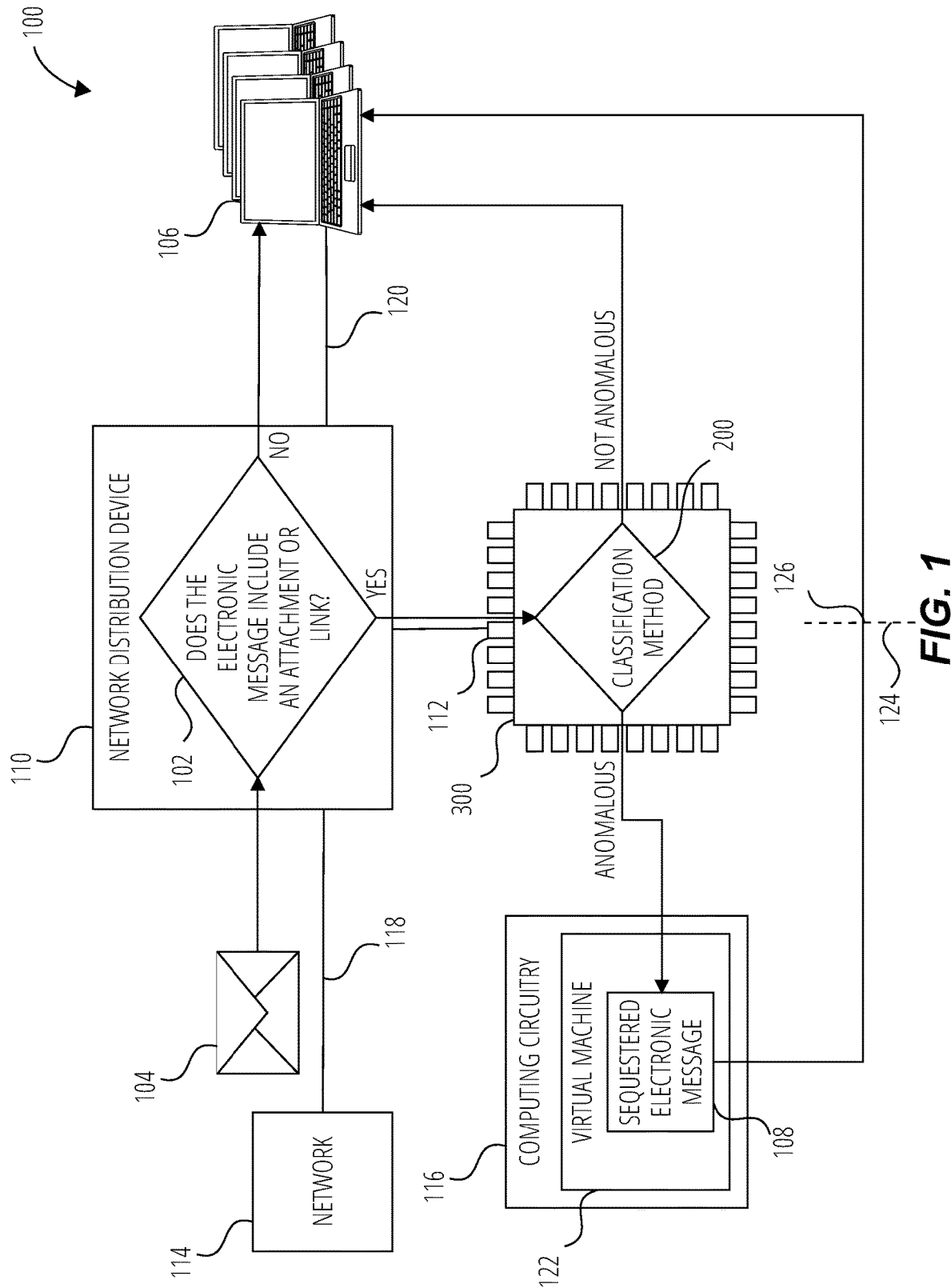
FIG. 1 is a block diagram of a security system for analyzing an electronic message for cyber threats, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Many entities use devices that are vulnerable to ransomware and malware documents transmitted electronically (e.g., via email). For example, many businesses rely on emailed office documents that leave their systems vulnerable to malware document attack vectors. Deploying machine learning based solutions has historically been computationally expensive, and may rely on cloud-based software solutions.

According to various embodiments disclosed herein, a device may use an attention mechanism in deep learning to accurately and reliably apply function labels (e.g., human-readable function labels, without limitation) to disassembled attached files in electronic messages and then send the reverse engineered function labels and links to a probabilistic autoencoder (e.g., a variational autoencoder) for anomaly detection. Attachments or links that are classified as anomalous are then sequestered on the device in a virtual machine for revision while attachments classified as non-anomalous are delivered to the user.

Machine learning-based semi-supervised learning may be a solution for anomaly detection and machine translation-based function naming. Programmable logic and on-premise deployment may be used to enable some embodiments disclosed herein. According to various embodiments disclosed herein, machine learning may be deployed on programmable logic for edge deployment. Semi-supervised anomaly detection and machine translation-based function naming may be used to detect anomalies in electronic communications. In various embodiments the result may include robust coverage of a Mitre Adversarial Tactics, Techniques, and Common Knowledge (MITRE ATT&CK®) matrix.

Various embodiments disclosed herein may be implemented in programmable logic on a device that is separate and independent from a user's computer, which may be the target of cyberattacks delivered thereto using electronic messages such as email. By way of non-limiting example, machine learning elements (e.g., machine translation, probabilistic autoencoder, without limitation) may be implemented on an FPGA while the virtual machine running the operating system manages emails intended for the user's system until released from sequester and transferred to the host's system. Links or attachments that are flagged as anomalous may be kept in sequester and may be examined manually within the safety of a virtual machine implemented on a peripheral device without leaving the peripheral device. The peripheral device may be gapped from the user's system (e.g., using a firewall), and may not include wireless communication capabilities such as BLUETOOTH®, Wi-fi, or Zigbee communication capabilities. The only communication channel between the peripheral device and the user's system may be a port defined in a firewall exception to communicate messages that are cleared via examination on the virtual machine to the user's system. The speed of anomaly flagging may be on the millisecond timescale and enables support for monitoring multiple host systems.

Various embodiments disclosed herein may directly address ransomware threats faced by small to midsize companies that cannot support extensive IT organizations to promote training or prevent spear phishing attacks.

FIG. 1 is a block diagram of a security system 100 for analyzing an electronic message 104 for cyber threats, according to some embodiments. The security system 100 may be used to prevent phishing and spear phishing attacks. The security system 100 includes a network distribution device 110 communicatively connected to a network 114 (e.g., an internet protocol network) via a network interface 118, one or more destination devices 106 communicatively connected to the network distribution device 110 via a local network 120 (e.g., a local area network such as Ethernet networks and/or Wi-Fi networks). The security system 100 also includes a programmable device 300 communicatively connected to the network distribution device 110 and computing circuitry 116 communicatively connected to the programmable device 300.

The network interface 118 is configured to receive message data corresponding to the electronic message 104 to be delivered to one of the one or more destination devices 106. The network distribution device 110 is configured to perform decision 102 to determine whether the electronic message 104 includes an attachment or a link. The network distribution device 110 is configured to deliver the received message data to the one of the one or more destination devices 106 responsive to a determination that the electronic message 104 includes neither an attached file nor a link. The network distribution device 110 is further configured to deliver the received message data to the programmable device 300 responsive to a determination that the electronic message 104 includes one or more of the attached file or the link.

The programmable device 300 includes an input terminal 112 to receive, from the network distribution device 110, the message data corresponding to the electronic message 104. The programmable device 300 also includes processing circuitry that is configured to implement a classification method 200 to classify the electronic message as anomalous or not anomalous. For example, if the electronic message 104 includes an attached file, the programmable device 300 may disassemble the attached file to obtain assembly code from the attached file. The programmable device 300 may include a machine translator implemented thereon. The programmable device 300 may use the machine translator to translate the assembly code from the attached file to generate function labels corresponding to functions the assembly code is configured to instruct the one of the one or more destination devices 106 to perform. By way of non-limiting example, the generated function labels may include human-readable function labels.

The programmable device 300 may also be configured to classify the electronic message 104 as anomalous responsive to a determination that one or more of the function labels are suspicious. By way of non-limiting example, the programmable device 300 may include a variational autoencoder implemented thereon. The variational autoencoder may be trained to identify suspicious function labels. The programmable device 300 is configured to provide the function labels to the variational autoencoder to classify the electronic message as anomalous or not anomalous. By way of non-limiting example, the variational autoencoder may be configured to identify the one or more of the function labels as suspicious if one of the generated function labels indicates a decrypt function. Also by way of non-limiting example, the variational autoencoder may be configured to identify the one or more of the function labels as suspicious if one of the generated function labels indicates a key create function. As a further non-limiting example, the variational autoencoder may be configured to identify the one or more of the function labels as suspicious if one of the generated function labels indicates a message digest (MD) process block function. The programmable device 300 may be further configured to deliver the electronic message 104 to the one of the one or more destination devices 106 responsive to a classification of the electronic message 104 as not anomalous.

If the electronic message 104 includes a link the programmable device 300 may be configured to obtain a link label corresponding to the link. The programmable device 300 may be configured to determine that the electronic message 104 is anomalous responsive to a determination that the link label is suspicious. In addition to identifying suspicious function labels, the variational autoencoder implemented by the programmable device 300 may be trained to identify suspicious link labels. The programmable device 300 may be configured to provide the function labels and the link label, if any, to the variational autoencoder to identify whether the electronic message 104 is anomalous.

The computing circuitry 116 is configured to implement a virtual machine 122 separated from the destination devices 106 by a firewall 124. The programmable device 300 is configured to deliver the electronic message 104 to the virtual machine 122 responsive to a classification or identification of the electronic message 104 as anomalous. The virtual machine 122 is configured to interact with the electronic message 104 to determine whether the electronic message 104 includes a threat. A firewall exception port 126 communicatively connects the virtual machine 122 to the destination devices. In some embodiments no other communication pathway may communicatively connect the computing circuitry 116 to the destination devices 106. For example, the computing circuitry 116 may not include wireless communication capabilities such as BLUETOOTH®, Wi-Fi, or Zigbee communication capabilities. The virtual machine 122 is configured to deliver the electronic message 104 to the one of the one or more destination devices 106 via the firewall exception port 126 responsive to a determination that the electronic message 104 does not include a threat. The selection of a very high port number, for example higher than 1000, may reduce the chances of any malicious software in the attached file from detecting the firewall exception port 126 and infecting the destination devices 106 through the firewall exception port 126.

By way of non-limiting example, a human operator may interact with the attached file in the sequestered electronic message 108 to analyze the actual functionality of the attached file, and make a determination as to whether the electronic message 104 is safe to deliver to the destination devices 106. If the human operator determines that the attached file of the sequestered electronic message 108 is safe for delivery to the destination devices 106, the sequestered electronic message 108 may be delivered to the destination devices 106 through the firewall exception port 126.

In some embodiments the programmable device 300 and the computing circuitry 116 may be implemented together on a single device. In some embodiments the programmable device 300 and the computing circuitry 116 may be implemented on separate devices. In some embodiments the programmable device 300 and/or the computing circuitry 116 may be implemented locally to the local network 120. In some embodiments the programmable device 300 and/or the computing circuitry 116 may be implemented in a cloud network.

Figure 2:
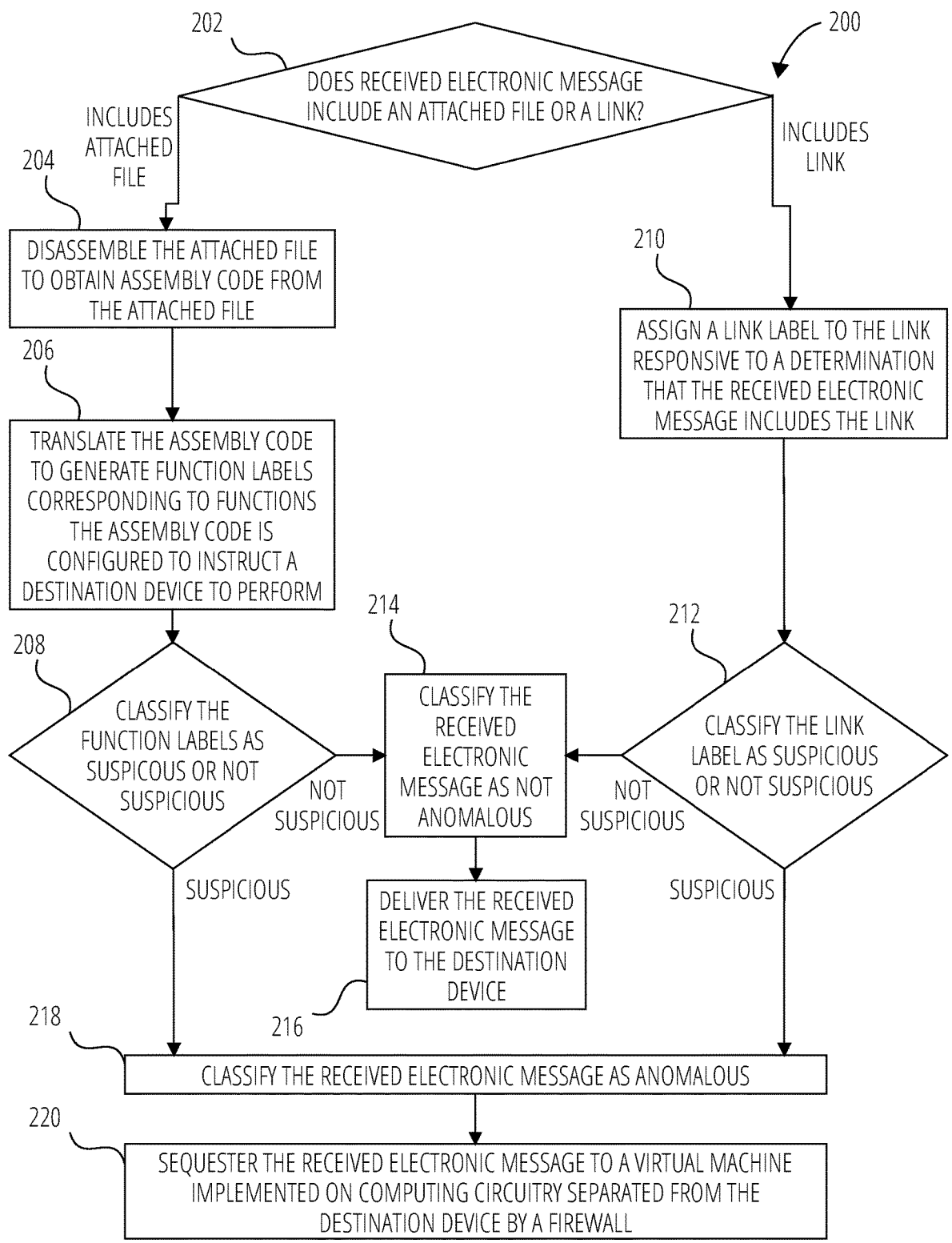
FIG. 2 is a flowchart illustrating a classification method, according to some embodiments.

FIG. 2 is a flowchart illustrating a classification method 200, according to some embodiments. The classification method 200 may be performed by the programmable device 300 of FIG. 2. At decision 202 the classification method 200 includes determining whether a received electronic message includes an attached file or a link. At operation 204 the classification method 200 includes disassembling the attached file responsive to a determination that the received electronic message includes the attached file to obtain assembly code from the attached file. At operation 206 the classification method 200 includes translating the assembly code to generate function labels corresponding to functions the assembly code is configured to instruct a destination device to perform. At decision 208 the classification method 200 includes classifying the function labels (e.g., using a variational autoencoder trained to identify suspicious function labels, without limitation) as suspicious or not suspicious. In some examples classifying the function labels as suspicious comprises identifying one of the function labels as a decrypt function.

At operation 210 the classification method 200 includes assigning a link label to the link responsive to a determination that the received electronic message includes the link. At decision 212 the classification method 200 includes classifying the link label (e.g., using the variational autoencoder) as suspicious or not suspicious.

At operation 214 the classification method 200 includes classifying the received electronic message as not anomalous responsive to classifications of the function labels and the link label as not suspicious. At operation 216 the classification method 200 includes delivering the received electronic message to the destination device responsive to a classification of the received electronic message as not anomalous.

At operation 218 the classification method 200 includes classifying the received electronic message as anomalous responsive to one or more of a classification of the function labels as suspicious or a classification of the link label as suspicious. At operation 220 the classification method 200 includes sequestering the received electronic message to a virtual machine implemented on computing circuitry separated from the destination device by a firewall responsive to a classification of the received electronic message as anomalous.

Figure 3:
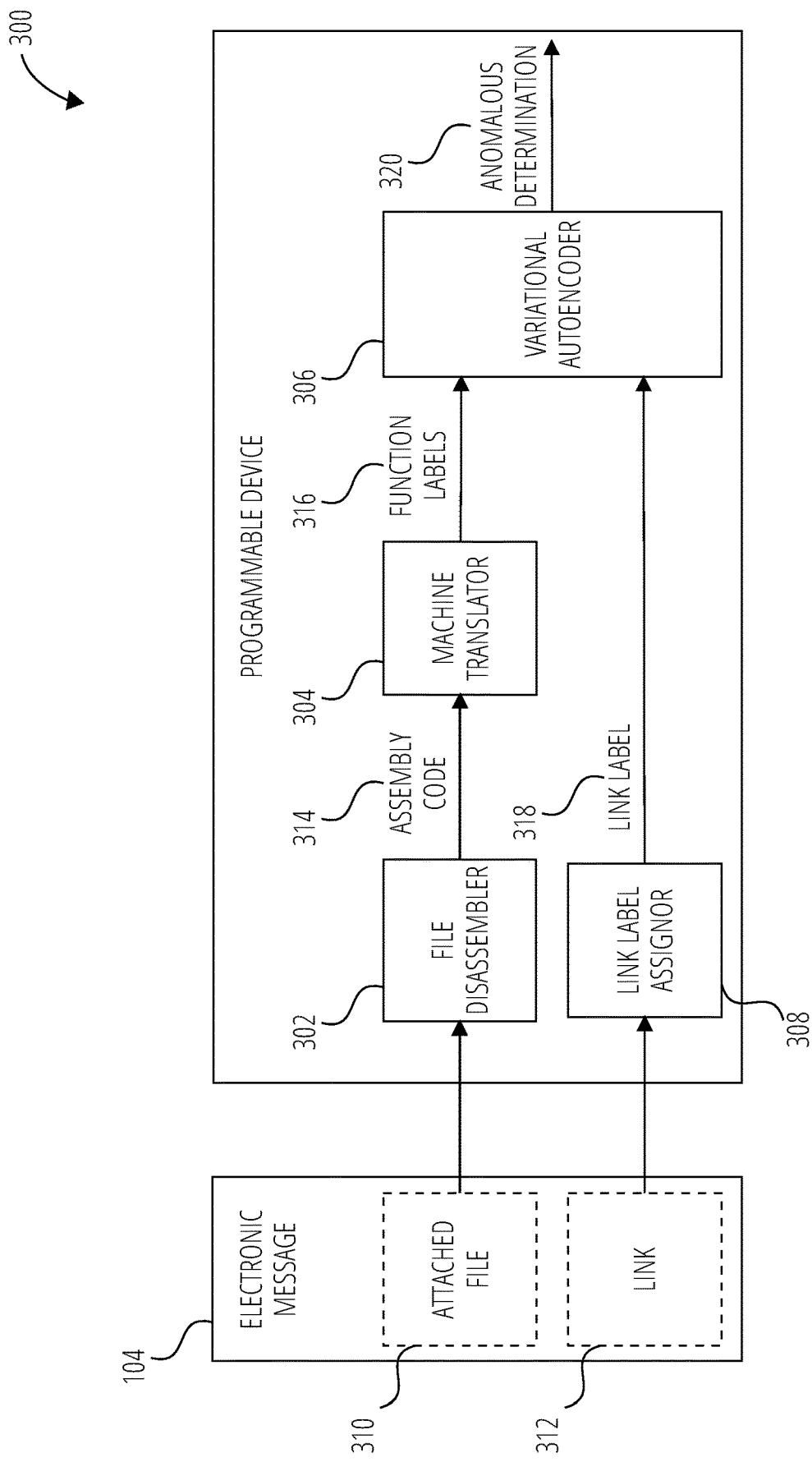
FIG. 3 is a block diagram of the programmable device of FIG. 1, according to some embodiments.

FIG. 3 is a block diagram of the programmable device 300 of FIG. 1, according to some embodiments. The programmable device 300 includes a file disassembler 302, a machine translator 304, a variational autoencoder 306, and a link label assignor 308. The programmable device 300 is configured to receive, as input, the electronic message 104 of FIG. 1 and generate an anomalous determination 320 indicating whether the electronic message 104 is determined to be anomalous or not anomalous.

The electronic message 104 may include an attached file 310, a link 312, or both. In embodiments where the attached file 310 includes the attached file 310, the file disassembler 302 is configured to generate assembly code 314 by disassembling the attached file 310.

The machine translator 304 is configured to translate the assembly code 314 into function labels 316. Although functions the assembly code 314 is configured to instruct the destination device to perform may be identified by merely debugging the assembly code 314 to generate debugging information, such debugging may not be capable of performance on a real-time or substantially real-time basis. Instead of using debugging to generate the function labels 316, the machine translator 304 may be trained, using machine learning techniques, to recognize, from the assembly code 314, various different functions that may be correlated with malicious activity. By way of non-limiting example, the machine translator 304 may be trained using training files that include decrypt functions (e.g., dsa_priv_decode) to teach the machine translator 304 to recognize decrypt functions. Decrypt functions may be of particular relevance because if the attached file 310 includes code that has been encrypted to avoid detection by conventional cyber threat detection tools, a decrypt function may be used to decrypt the encrypted code once the destination device opens the attached file, which may occur after a conventional cyber threat detection tool analyzes the attached file 310. Identification of decrypt functions by the machine translator 304 may enable the variational autoencoder 306 to make an anomalous determination 320 of anomalous to prevent such an attached file 310 from being provided to the destination device. Other functions that may be correlated with cyber threats include a key create function (e.g., EVP-PKEY_new) and an MD process block function (e.g., md4_block_data_order).

In some embodiments, during training of the machine translator 304 both training assembly code and previously generated debugging information (which indicates functions of the training assembly code) obtained from previously debugging the training assembly code may be fed to the machine translator 304. The machine translator 304 may learn to recognize functions included in the training assembly code based on the accompanying debugging information. The machine translator 304 may be specifically trained to recognize functions, such as decrypt functions, that may be associated with cyber threats. With the machine translator 304 thus trained to recognize functions in assembly code 314, the machine translator 304 may generate the function labels 316 without debugging the assembly code 314, which may protect the programmable device 300 from malicious code in the attached file 310 and enable the machine translator 304 to provide the function labels 316 in substantially real time.

In embodiments where the electronic message 104 includes the link 312, the link label assignor 308 is configured to generate a link label 318 responsive to the link 312. The function labels 316 and/or the link label 318 are provided to the variational autoencoder 306, which is trained to identify suspicious function labels (e.g., decrypt, key create, and/or MD process block functions) and suspicious link labels. The variational autoencoder 306 is configured to provide the anomalous determination 320 responsive to the function labels 316 and the link label 318.

Figure 4:
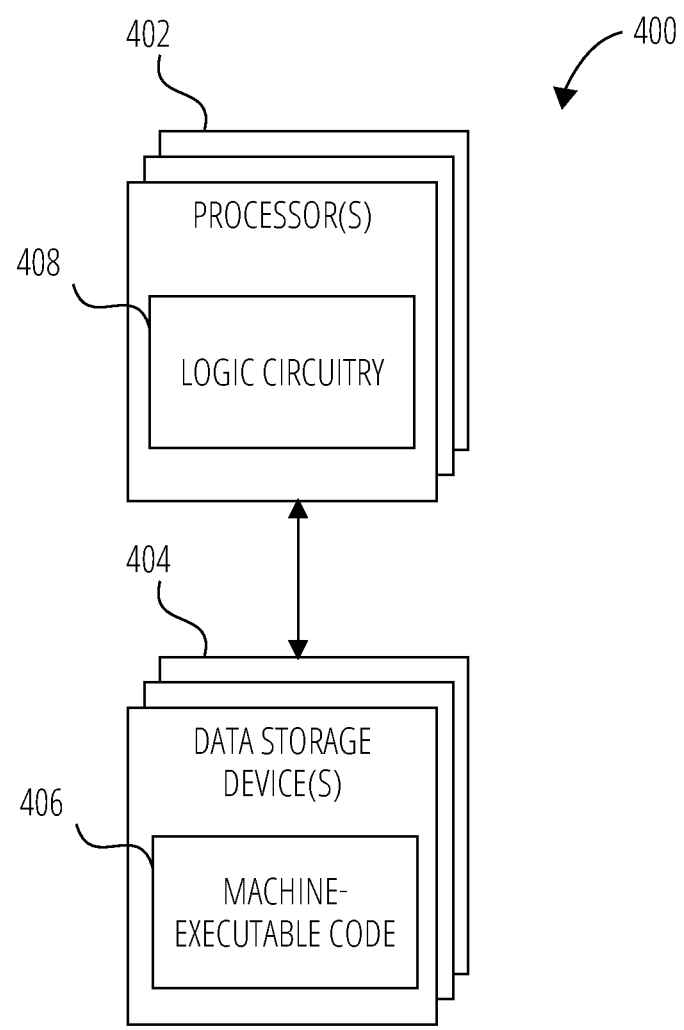
FIG. 4 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 4 illustrates non-limiting examples of implementations of functional elements disclosed herein. In some embodiments, some or all portions of the functional elements disclosed herein may be performed by hardware specially configured for carrying out the functional elements.

FIG. 4 is a block diagram of circuitry 400 that, in some embodiments, may be used to implement various functions, operations, acts, processes, and/or methods disclosed herein. The circuitry 400 includes one or more processors 402 (sometimes referred to herein as "processors 402") operably coupled to one or more data storage devices (sometimes referred to herein as "storage 404"). The storage 404 includes machine-executable code 406 stored thereon and the processors 402 include logic circuitry 408. The machine-executable code 406 includes information describing functional elements that may be implemented by (e.g., performed by) the logic circuitry 408. The logic circuitry 408 is adapted to implement (e.g., perform) the functional elements described by the machine-executable code 406. The circuitry 400, when executing the functional elements described by the machine-executable code 406, should be considered as special purpose hardware configured for carrying out functional elements disclosed herein. In some embodiments the processors 402 may be configured to perform the functional elements described by the machine-executable code 406 sequentially, concurrently (e.g., on one or more different hardware platforms), or in one or more parallel process streams.

When implemented by logic circuitry 408 of the processors 402, the machine-executable code 406 is configured to adapt the processors 402 to perform operations of embodiments disclosed herein. For example, the machine-executable code 406 may be configured to adapt the processors 402 to perform at least a portion or a totality of the classification method 200 of FIG. 2. As another example, the machine-executable code 406 may be configured to adapt the processors 402 to perform at least a portion or a totality of the operations discussed for the programmable device 300 of FIG. 1 and FIG. 3, the computing circuitry 116 of FIG. 1, the network distribution device 110 of FIG. 1, the file disassembler 302 of FIG. 3, the machine translator 304 of FIG. 3, the variational autoencoder 306 of FIG. 3, and the link label assignor 308 of FIG. 3.

The processors 402 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 406 (e.g., software code, firmware code, hardware descriptions) related to embodiments of the present disclosure. It is noted that a general-purpose processor (may also be referred to herein as a host processor or simply a host) may be a microprocessor, but in the alternative, the processors 402 may include any conventional processor, controller, microcontroller, or state machine. The processors 402 may also be implemented as a combination of computing devices, such as a combination of a DSP and a microprocessor, a plurality of microprocessors, one or more microprocessors in conjunction with a DSP core, or any other such configuration.

In some embodiments the storage 404 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 402 and the storage 404 may be implemented into a single device (e.g., a semiconductor device product, a system on chip (SOC), etc.). In some embodiments the processors 402 and the storage 404 may be implemented into separate devices.

In some embodiments the machine-executable code 406 may include computer-readable instructions (e.g., software code, firmware code). By way of non-limiting example, the computer-readable instructions may be stored by the storage 404, accessed directly by the processors 402, and executed by the processors 402 using at least the logic circuitry 408. Also by way of non-limiting example, the computer-readable instructions may be stored on the storage 404, transferred to a memory device (not shown) for execution, and executed by the processors 402 using at least the logic circuitry 408. Accordingly, in some embodiments the logic circuitry 408 includes electrically configurable logic circuitry 408.

In some embodiments the machine-executable code 406 may describe hardware (e.g., circuitry) to be implemented in the logic circuitry 408 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 408 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 406 may include an HDL, an RTL, a GL description, a mask level description, other hardware description, or any combination thereof.

In embodiments where the machine-executable code 406 includes a hardware description (at any level of abstraction), a system (not shown, but including the storage 404) may be configured to implement the hardware description described by the machine-executable code 406. By way of non-limiting example, the processors 402 may include a programmable logic device (e.g., an FPGA or a PLC) and the logic circuitry 408 may be electrically controlled to implement circuitry corresponding to the hardware description into the logic circuitry 408. Also by way of non-limiting example, the logic circuitry 408 may include hard-wired logic manufactured by a manufacturing system (not shown, but including the storage 404) according to the hardware description of the machine-executable code 406.

Regardless of whether the machine-executable code 406 includes computer-readable instructions or a hardware description, the logic circuitry 408 is adapted to perform the functional elements described by the machine-executable code 406 when implementing the functional elements of the machine-executable code 406. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
   an input terminal to receive message data corresponding to an electronic message to be delivered to a destination device; and
   processing circuitry configured to, if the electronic message includes one or more attached files:
     disassemble the one or more attached files to obtain assembly code from the one or more attached files;
     translate the assembly code to generate function labels corresponding to functions the assembly code is configured to instruct the destination device to perform; and
     classify the electronic message as anomalous responsive to one or more of the generated function labels being identified as a suspicious function label indicating malicious code in the one or more attached files.

2. The apparatus of claim 1, wherein the processing circuitry is configured to identify the one or more of the generated function labels as the suspicious function label indicating the malicious code if one of the generated function labels indicates a decrypt function.

3. The apparatus of claim 1, wherein the processing circuitry is configured to identify the one or more of the generated function labels as the suspicious function label indicating the malicious code if one of the generated function labels indicates a key create function.

4. The apparatus of claim 1, wherein the processing circuitry is configured to identify the one or more of the generated function labels as the suspicious function label indicating the malicious code if one of the generated function labels indicates a message digest (MD) process block function.

5. The apparatus of claim 1, wherein the generated function labels include human-readable function labels.

6. The apparatus of claim 1, wherein the processing circuitry is configured to deliver the electronic message to a virtual machine separated from the destination device by a firewall responsive to a determination that the electronic message is anomalous.

7. The apparatus of claim 1, wherein if the electronic message includes a link, the processing circuitry is further configured to obtain a link label corresponding to the link.

8. The apparatus of claim 7, wherein the processing circuitry is configured to determine that the electronic message is anomalous responsive to a determination that the link label is suspicious.

9. The apparatus of claim 8, wherein the processing circuitry includes a variational autoencoder implemented thereon, the variational autoencoder trained to identify suspicious function labels and suspicious link labels, the processing circuitry configured to provide the generated function labels and the link label, if any, to the variational autoencoder to identify whether the electronic message is anomalous.

10. The apparatus of claim 1, wherein the processing circuitry includes a machine translator implemented thereon, the machine translator trained to translate the assembly code to the generated function labels.

11. The apparatus of claim 1, wherein the processing circuitry is configured to provide the generated function labels to a classifier trained to identify suspicious function labels indicating malicious code.

12. The apparatus of claim 11, wherein the processing circuitry is configured to provide the generated function labels to the classifier trained to identify the suspicious function labels indicating the malicious code comprising malware or ransomware.

13. A network system, comprising:
one or more destination devices;
a network interface configured to receive message data corresponding to an electronic message to be delivered to one of the one or more destination devices;
a network distribution device configured to deliver the received message data to the one of the one or more destination devices responsive to a determination that the electronic message includes neither an attached file nor a link; and
a programmable device including logic circuitry configured to:
translate, if the electronic message includes an attached file, assembly code from the attached file to generate function labels corresponding to functions the assembly code is configured to instruct the one of the one or more destination devices to perform;
classify the electronic message as anomalous responsive to a determination that one or more of the generated function labels include a suspicious function label indicating malicious code in the attached file; and
deliver the electronic message to the one of the one or more destination devices responsive to a classification of the electronic message as not anomalous.

14. The network system of claim 13, further comprising computing circuitry configured to implement a virtual machine separated from the one of the one or more destination devices by a firewall, wherein the programmable device is configured to deliver the electronic message to the virtual machine responsive to a classification of the electronic message as anomalous.

15. The network system of claim 14, wherein the virtual machine is configured to interact with the electronic message to determine whether the electronic message includes a threat.

16. The network system of claim 15, further comprising a firewall exception port communicatively connecting the virtual machine to the one of the one or more destination devices, wherein the virtual machine is configured to deliver the electronic message via the firewall exception port responsive to a determination that the electronic message does not include a threat.

17. The network system of claim 13, wherein the programmable device including the logic circuitry includes a variational autoencoder implemented thereon, the variational autoencoder trained to identify suspicious function labels indicating malicious code, the programmable device configured to provide the generated function labels to the variational autoencoder to classify the electronic message as anomalous or not anomalous.

18. A classification method, comprising:
determining whether a received electronic message includes an attached file;
disassembling the attached file responsive to a determination that the received electronic message includes the attached file to obtain assembly code from the attached file;
translating the assembly code to generate function labels corresponding to functions the assembly code is configured to instruct a destination device to perform;
classifying the generated function labels, using a variational autoencoder trained to identify suspicious function labels indicating malicious code, as suspicious or not suspicious;
classifying the received electronic message as anomalous responsive to a classification of one or more of the generated function labels of the attached file as suspicious; or
classifying the received electronic message as not anomalous responsive to a classification of the generated function labels of the attached file as not suspicious.

19. The classification method of claim 18, further comprising:
determining whether the received electronic message includes a link;
assign a link label to the link responsive to a determination that the received electronic message includes the link;
classifying the link label, using the variational autoencoder, as suspicious or not suspicious;
classifying the received electronic message as anomalous responsive to a classification of the link label as suspicious; or
classifying the received electronic message as not anomalous responsive to a classification of the link label as not suspicious.

20. The classification method of claim 18, further comprising delivering the received electronic message to the destination device responsive to a classification of the received electronic message as not anomalous.

21. The classification method of claim 18, further comprising sequestering the received electronic message to a virtual machine implemented on computing circuitry separated from the destination device by a firewall responsive to a classification of the received electronic message as anomalous.

22. The classification method of claim 18, wherein classifying the generated function labels as suspicious comprises identifying one of the generated function labels as a decrypt function.

23. The classification method of claim 18, further comprising:
sending the generated function labels of the attached file to the variational autoencoder trained to identify the suspicious function labels indicating malicious code.

* * * * *